(12) United States Patent
Graham et al.

(10) Patent No.: US 9,382,871 B2
(45) Date of Patent: Jul. 5, 2016

(54) METHOD FOR REPAIR OF CYLINDER BLOCK INCLUDING WATER FERRULE

(71) Applicant: Caterpillar Inc., Peoria, IL (US)

(72) Inventors: Curtis J. Graham, Peoria, IL (US);
Trent A. Simpson, Peoria, IL (US);
Adam Ostein, Edelstein, IL (US);
Bharat K. Meduru, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 165 days.

(21) Appl. No.: 14/168,336

(22) Filed: Jan. 30, 2014

(65) Prior Publication Data

US 2015/0211436 A1 Jul. 30, 2015

(51) Int. Cl.
| | |
|---|---|
| *F02F 1/14* | (2006.01) |
| *F02F 1/10* | (2006.01) |
| *F01P 9/02* | (2006.01) |
| *B23P 6/00* | (2006.01) |
| *F02F 11/00* | (2006.01) |
| *B23P 6/02* | (2006.01) |

(52) U.S. Cl.
CPC .................. *F02F 11/002* (2013.01); *B23P 6/02* (2013.01); *F02F 2001/106* (2013.01); *Y10T 29/49233* (2015.01)

(58) Field of Classification Search
CPC ........... F02F 1/18; F02F 11/002; F02F 1/004; F02F 3/00

USPC ............... 123/41.86, 41.01, 41.17, 41.79; 29/888.011
See application file for complete search history.

(56) References Cited

U.S. PATENT DOCUMENTS

| | | | |
|---|---|---|---|
| 2,395,243 A | 2/1946 | Aukers | |
| 3,570,374 A | 3/1971 | Stratton | |
| 6,139,026 A | 10/2000 | Gruver, III et al. | |
| 6,971,682 B2 | 12/2005 | Hoang et al. | |
| 2010/0000090 A1* | 1/2010 | Moss ........................ | B23P 6/02 29/888.01 |
| 2012/0036715 A1* | 2/2012 | Kramer ..................... | B23P 6/00 29/888.011 |
| 2013/0038027 A1 | 2/2013 | Feldner et al. | |
| 2013/0081589 A1* | 4/2013 | Ostein ....................... | B23P 6/02 123/193.1 |

\* cited by examiner

*Primary Examiner* — Lindsay Low
*Assistant Examiner* — Syed O Hasan

(57) ABSTRACT

A method for repair of a cylinder block including a water ferrule having damage in an area proximate to the water ferrule is disclosed. The repair method includes removing material from the area containing and surrounding the damage. The method also includes providing a counter bore sized to surround the removed material. The counter bore is configured to define a seat at the one end of the water ferrule. A sealing member is aligned and introduced into the seat of the counter bore. The method includes aligning a stepped insert coaxially with the sealing member and the seat. The method also includes a step of introducing the insert into the seat of the counter bore to form an interference fit therewith. The method further includes providing a seal formed by a combination of the sealing member and the insert within the seat of the counter bore.

16 Claims, 5 Drawing Sheets

METHOD FOR REPAIR OF CYLINDER BLOCK INCLUDING WATER FERRULE

TECHNICAL FIELD

The present disclosure relates to a cylinder block, and more particularly to a system and method for repair of the cylinder block having a damage proximate to a water ferrule.

BACKGROUND

A cylinder block of an engine includes water ferrules. The water ferrules serve as a passage for cooling water to enter into the cylinder head and other engine parts for cooling purposes. During an operation of the engine, an area on an upper surface of the cylinder block, proximate to the water ferrule may erode or wear out. The damaged area requires repair as water passing through the water ferrules may leak through the damages into various engine components. This may hamper overall working of the engine.

Methods for sealing the water ferrule includes providing an insert, such that a liquid retention compound and a press fit between the insert and the water ferrule is utilized for the sealing. The sealing provided by this method varies greatly on factors such as surface preparation and cleanliness of the cylinder block and also on the application and curing time of the liquid retention compound. Hence, this method may be a time consuming process.

U.S. Pat. No. 6,971,682 discloses a coupling assembly for fuel transfer includes a first inner conduit attached to a first ferrule adapter and a second inner conduit attached to a second ferrule adapter. An inner conduit coupling engages the first inner conduit sealing mechanism and the second inner conduit sealing mechanism, thereby connecting the first inner conduit to the second inner conduit. A first outer conduit surrounds the first inner conduit. The first outer conduit is attached to the first ferrule adapter and the second outer conduit is attached to the second ferrule adapter. An outer conduit coupling engages the first and second outer conduit sealing mechanism thereby connecting the first outer conduit to the second outer conduit.

SUMMARY OF THE DISCLOSURE

In one aspect of the present disclosure, a method for repair of a cylinder block including a water ferrule is disclosed. The water ferrule includes damage in at least one area proximate to the water ferrule. The method includes removing material from the area containing and surrounding the damage. The method also includes providing a counter bore sized to surround the removed material. The counter bore is positioned on one end of the water ferrule, such that a bore of the water ferrule communicates with the counter bore. Further, the counter bore is configured to define a seat at the one end of the water ferrule. The method further includes aligning a sealing member coaxially with the seat of the counter bore. The method includes introducing the sealing member into the seat of the counter bore. The sealing member has an outer diameter lesser than an outer diameter of the counter bore. The method includes aligning an insert coaxially with the sealing member and the seat. The insert includes a stepped portion at one end. The steeped portion extends axially from a side of the insert facing the sealing member. The method also includes introducing the insert into the seat of the counter bore to form an interference fit therewith. The method includes pressing the sealing member against the stepped portion of the insert and the seat. The method further includes providing a seal formed by a combination of the sealing member and the insert within the seat of the counter bore.

In another aspect of the present disclosure, a repaired cylinder block having a water ferrule is disclosed. The water ferrule includes a sealing member provided within a seat defined by a counter bore of the water ferrule. The counter bore is provided on one end of the water ferrule such that the counter bore is sized to surround a material removed from the cylinder block containing damage in at least one area proximate to the water ferrule. An outer diameter of the sealing member is less than an outer diameter of the counter bore. Further, an insert is provided within the seat, such that the insert forms an interference fit with the seat of the counter bore. Further, the sealing member is configured to press against the stepped portion of the insert and the seat such that a combination of the sealing member and the insert forms a seal within the seat of the counter bore.

Other features and aspects of this disclosure will be apparent from the following description and the accompanying drawings.

DETAILED DESCRIPTION

Figure 1:
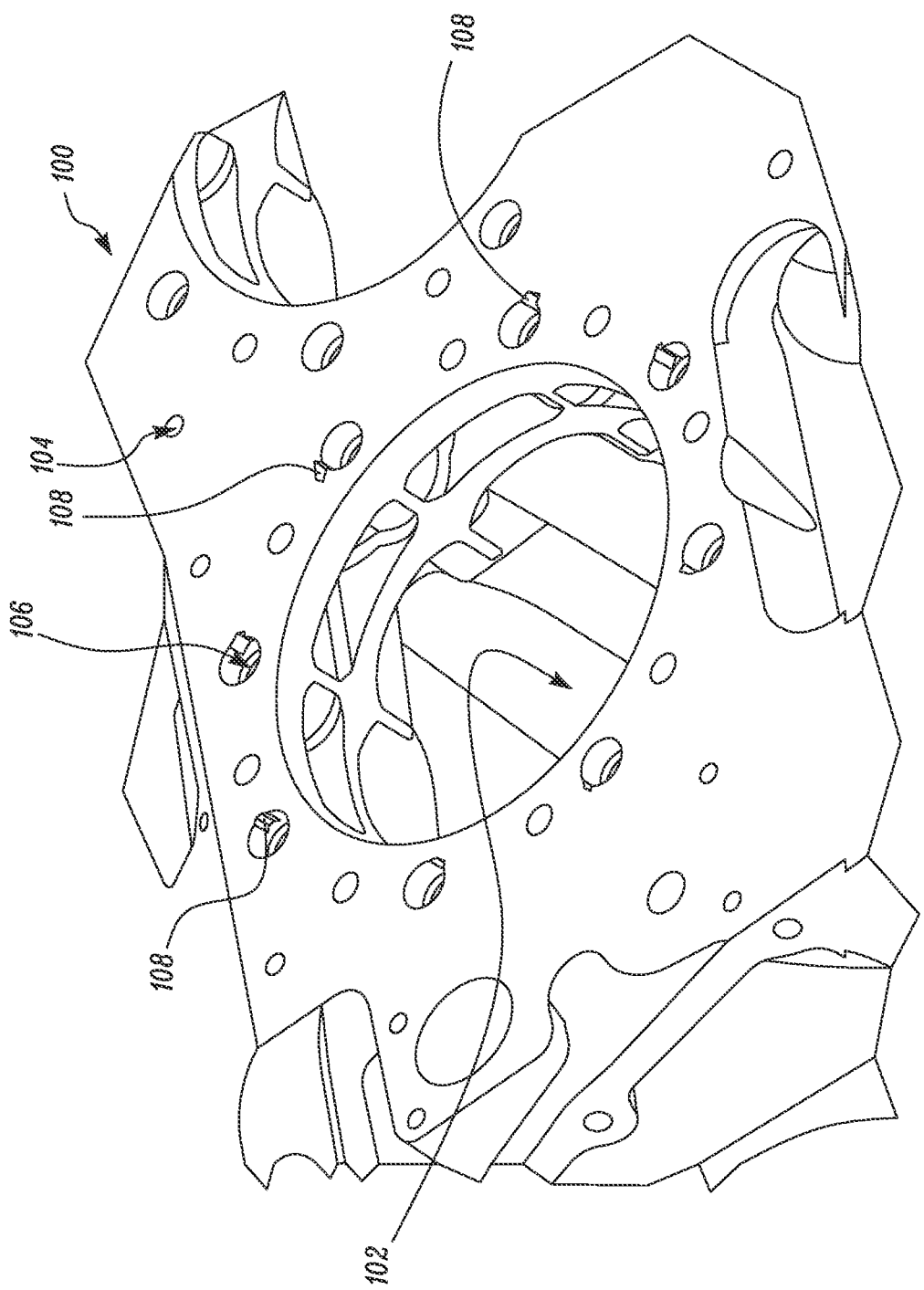
FIG. 1 is a perspective view of an exemplary cylinder block including a water ferrule having a damage proximate to the water ferrule.

Wherever possible the same reference numbers will be used throughout the drawings to refer to the same or the like parts. Referring to FIG. 1, an exemplary cylinder block 100 associated with an engine is illustrated. More specifically, the engine is a multi-cylinder internal combustion (IC) engine. The engine may be powered by any one or a combination of known liquid or gaseous fuels including, but not limited to, gasoline, diesel, natural gas, petroleum gas and bio-fuels.

The engine includes a cylinder head (not shown) and the cylinder block 100. The cylinder block 100 includes a plurality of cylinders 102. Each of the plurality of the cylinders 102 may be configured to house a piston (not shown). Further, a bore of the cylinder 102 may include a cylinder liner (not shown) provided between the piston and the cylinder bore. A gasket (not shown) may be provided between the cylinder head and the cylinder block 100. The gasket may include a plurality of holes provided thereon. The gasket is configured to seal the cylinders 102 to provide maximum compression and prevent leakage of a coolant or engine oil into the cylinders 102.

Additionally, the cylinder block 100 and the cylinder head may include a plurality of apertures 104. The plurality of apertures 104 on the cylinder block 100 and the cylinder head may be aligned with the holes provided on the gasket in order to attach the cylinder block 100 to the gasket and the cylinder head. As seen in the accompanying figures, the cylinder block 100 includes a plurality of water ferrules 106. The water ferrules 106 are provided in the cylinder block 100 to circulate water around the cylinders 102 and also into the cylinder head. Further, a water pump (not shown) may be associated with the engine to push cooling water into the water ferrules 106.

The water ferrules 106 may have varying diameters. In the illustrated embodiment, two sets of the water ferrules 106 are provided such that each set has a different diameter. A diameter of a first set of the water ferrules 106 is greater compared to a diameter of a second set of the water ferrules 106.

The water ferrules 106 may be shaped as through holes provided on the cylinder block 100. During operation, the cooling water from the water ferrules 106 may flow along the gasket and further into an opening provided within the cylinder head. The cooling water may then circulate within the cylinder head in order to cool various portions of the cylinder head.

In some situations, during the operation of the engine, an area proximate to the water ferrule 106 may erode or get damaged (shown as 108 in FIG. 1). Due to the damage 108, uneven surfaces may be formed in an area within and/or around the water ferrule 106, thereby leading to water leakage into various parts of the engine. The present disclosure relates to a method for repairing the water ferrule 106 which will be explained in detail in connection with FIGS. 2 to 4.

Figure 2:
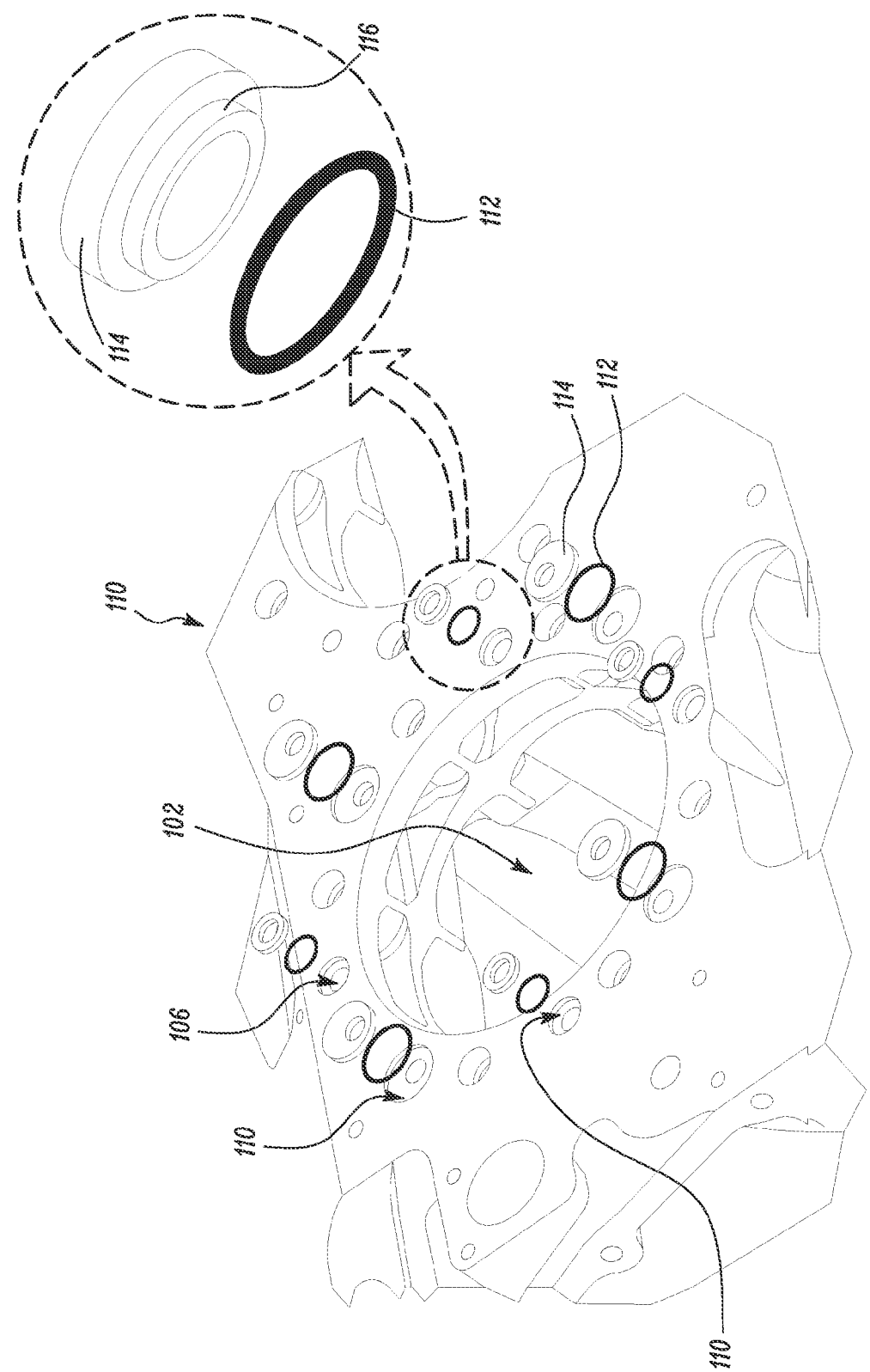
FIG. 2 is an exploded view of an insert and a sealing member being introduced within a counter bore of the water ferrule.

Material surrounding and/or containing the damage 108 is removed. Referring to FIG. 2, a counter bore 110 (see FIG. 2) is provided at one end of the cylinder block 100 and is sized to surround the removed material of the water ferrule 106. In the illustrated embodiment, the damage 108 is present on an upper surface of the cylinder block 100 and accordingly the counter bore 110 is provided on the upper surface of the cylinder block 100 such that providing the counter bore 110 causes the damage 108 to be removed from the surface of the cylinder block 100. Further, the counter bore 110 is provided such that a bore of the water ferrule 106 communicates with the counter bore 110. An inner diameter of the counter bore 110 corresponds to a diameter of the bore of the water ferrule 106. Additionally, the diameter of the bore of the water ferrule 106 is less compared to an outer diameter of the counter bore 110. The counter bore 110 may be provided to a depth within the cylinder block 100, such that a depth of the counter bore 110 is less than a depth of the water ferrule 106. The counter bore 110 is configured to define a seat at the one end of the water ferrule 106.

It should be noted that the counter bore 110 may or may not be concentric with the water ferrule 106. For example, if the damage 108 is positioned relatively close to the water ferrule 106, the counter bore 110 and the water ferrule 106 may be concentric with each other. In another example, when the damage 108 is farther away from the water ferrule 106, the counter bore 110 may be positioned such that by providing the counter bore 110, the damage is removed from the cylinder block 100. In this case, the counter bore 110 and the water ferrule 106 may not be concentric with each other.

A sealing member 112 may be aligned with and introduced into the seat defined by the counter bore 110. The sealing member 112 may be made of a flexible material, for example, rubber. Further, the sealing member 112 may have a ring shaped configuration. In one embodiment, the sealing member 112 may be embodied as an O-ring. The sealing member 112 is shaped such that an inner diameter of the sealing member 112 is greater than the diameter of the bore of the water ferrule 106. Further, an outer diameter of the sealing member 112 is smaller than the outer diameter of the counter bore 110, so that the sealing member 112 may be easily received into the seat of the counter bore 110. The difference in the outer diameter of the sealing member 112 and that of the counter bore 110 may be such that a small amount of clearance is present in order to accommodate an expansion of the sealing member 112 when the sealing member 112 is compressed within the counter bore 110.

An insert 114 is aligned with the sealing member 112 and the seat of the counter bore 110. The insert 114 may be made of a metal, for example, stainless steel. Further, a thickness of the insert 114 is equal to the depth of the counter bore 110, such that the insert 114 is received into the seat of the counter bore 110 to form an interference fit therewith.

The shape and design of the insert 114 is provided such that the insert 114 corresponds to the sealing member 112 and the seat of the counter bore 110. On installation, the insert 114 in combination with the sealing member 112 is configured to provide a seal within the water ferrule 106 in order to minimize and/or prevent leakage of water therethrough.

As shown in FIG. 2, the insert 114 may have a disc shaped configuration including a stepped portion 116. The insert 114 is positioned such that when assembled, the stepped portion 116 extends axially from a side of the insert 114 facing the sealing member 112. Further, an outer diameter of the stepped portion 116 of the insert 114 is lesser than an outer diameter of a body of the insert 114. Further, the stepped portion 116 is sized in cooperation with the sealing member 112 and the seat of the counter bore 110. The stepped portion 116 is provided so that when the insert 114 is received within the counter bore 110, a groove 118 (see FIG. 4) is formed between the stepped portion 116 of the insert 114 and the counter bore 110. The sealing member 112 is configured to be positioned and captured within the groove 118, such that the groove 118 is configured to secure the sealing member 112 with respect to the insert 114 and the counter bore 110.

Figure 3:
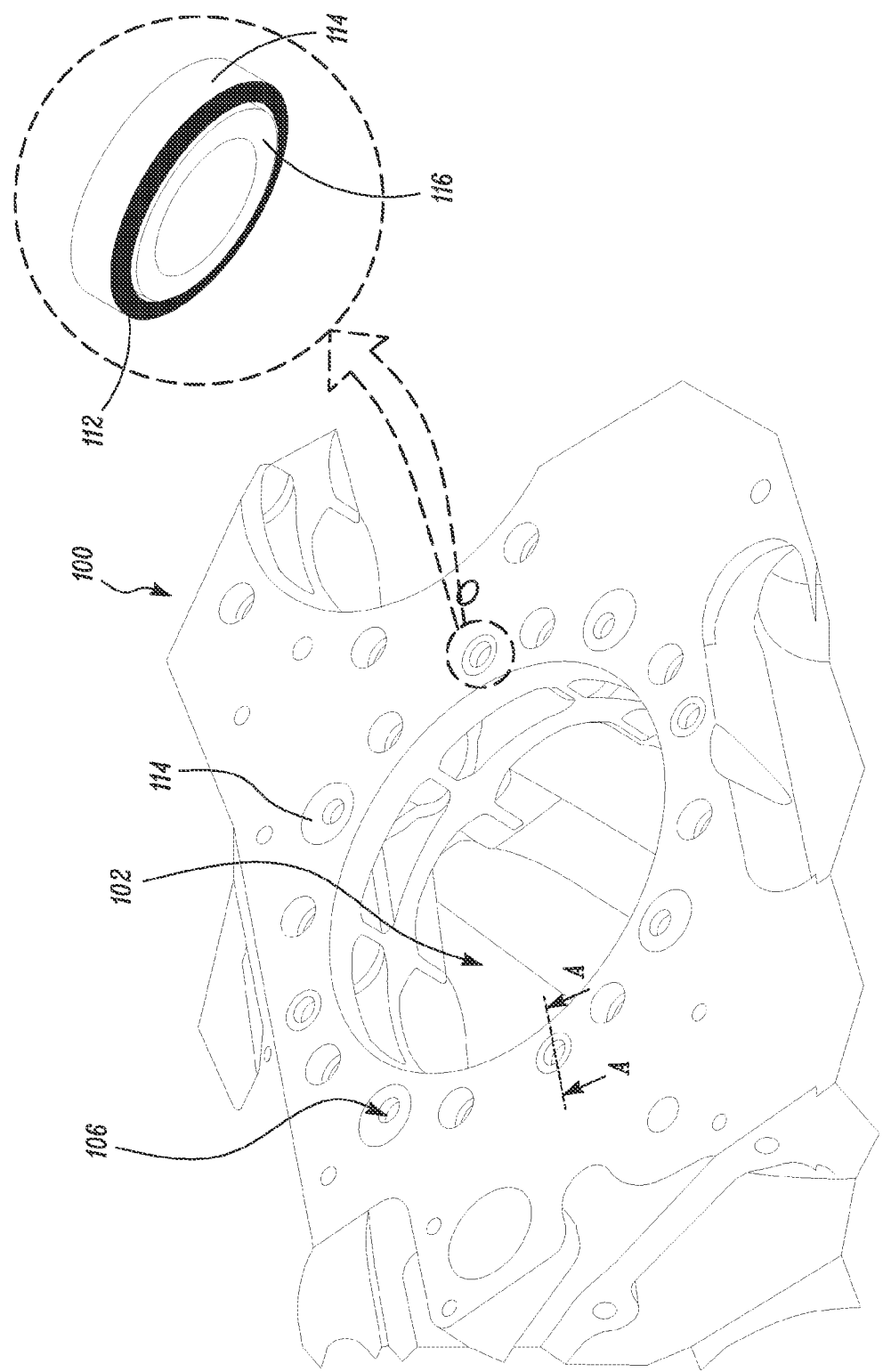
FIG. 3 is an assembled view wherein the insert and the sealing member are received within the counter bore of the water ferrule.
Figure 4:
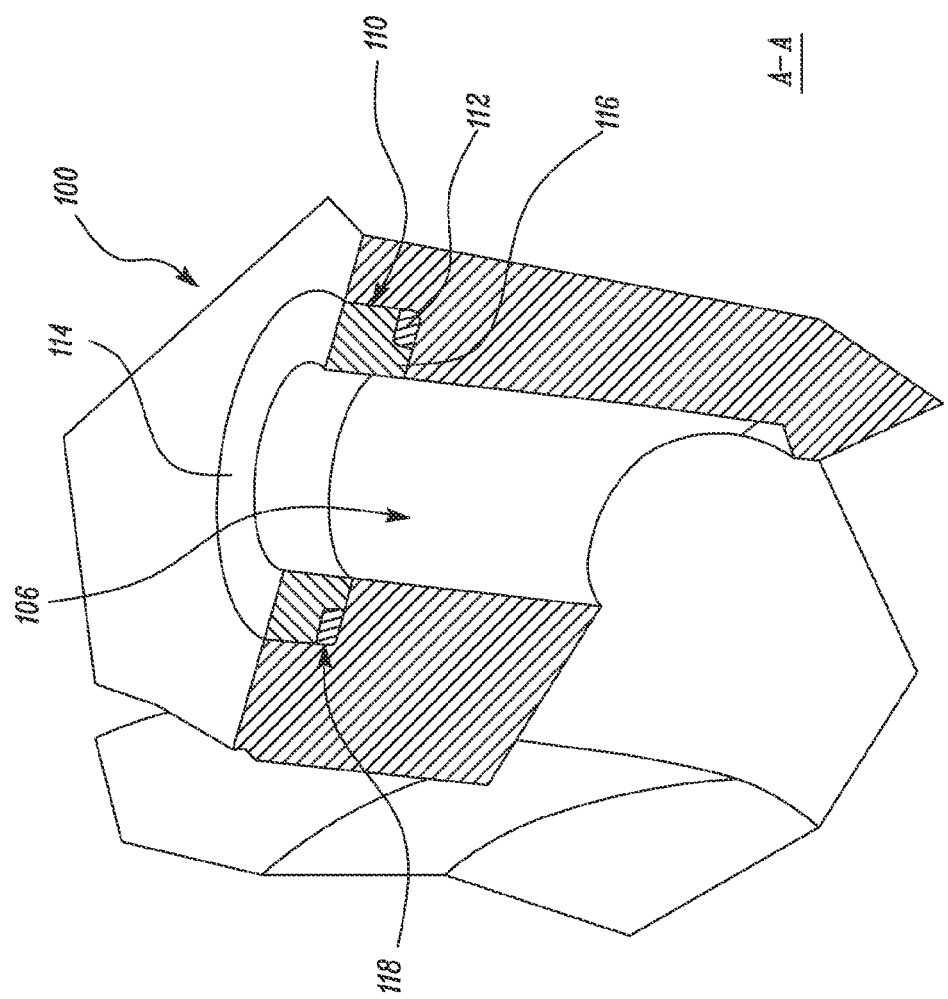
FIG. 4 is a cross-sectional view of the water ferrule with the insert and the sealing member received therein.

FIG. 3 shows an assembled view of the water ferrule 106 with the sealing member 112 and the insert 114 received within the counter bore 110. FIG. 4 is a cross-section of one of the water ferrules 106 shown in FIG. 3 along a cutting plane AA. When assembled, the sealing member 112 is configured to surround the stepped portion 116 of the insert 114. Accordingly, the inner diameter of the sealing member 112 is greater than the outer diameter of the stepped portion 116. The inner diameter of the sealing member 112 and the outer diameter of the stepped portion 116 are sized such that, when assembled within the seat of the counter bore 110, a clearance is provided therebetween to accommodate the expansion of the sealing member 112.

In one embodiment, an adhesive is provided within the seat of the counter bore 110. The adhesive is configured to secure the sealing member 112 and the insert 114 within the counter bore 110. Further, when the insert 114 is installed within the counter bore 110, a compressive force is exerted on the sealing member 112 causing the sealing member 112 to expand. The compressed sealing member 112 may contact with the stepped portion 116 of the insert 114 and the counter bore 110 thereby forming the seal within the counter bore 110.

Also, a thickness of the stepped portion 116 of the insert 114 is less than a thickness of the sealing member 112. Further, if required, a surface of the counter bore 110 and the insert 114 may be machined.

INDUSTRIAL APPLICABILITY

The combination of the appropriately sized sealing member 112 and the insert 114 disclosed herein provides an improved sealing and repair of the damage 108 proximate to and/or within the water ferrule 106 such that water leakages may be prevented or minimized. In this solution, there is no need to wait for a liquid retention compound to cure before machining of the cylinder block 100. Thus, the method described herein allows for a reduction in an assembly time and may be less prone to errors by personnel assembling the insert 114 and the sealing member 112. Further, the normal press fit inserts or inserts with liquid retention compound often leak as they are subjected to thermal cycling during engine operation. The thermal cycling can break the bond of the liquid sealant or temporarily distort the insert causing an intermittent fluid leak. The sealing member 112 disclosed herein can accommodate the thermal cycling movement and still maintain a good fluid seal.

Figure 5:
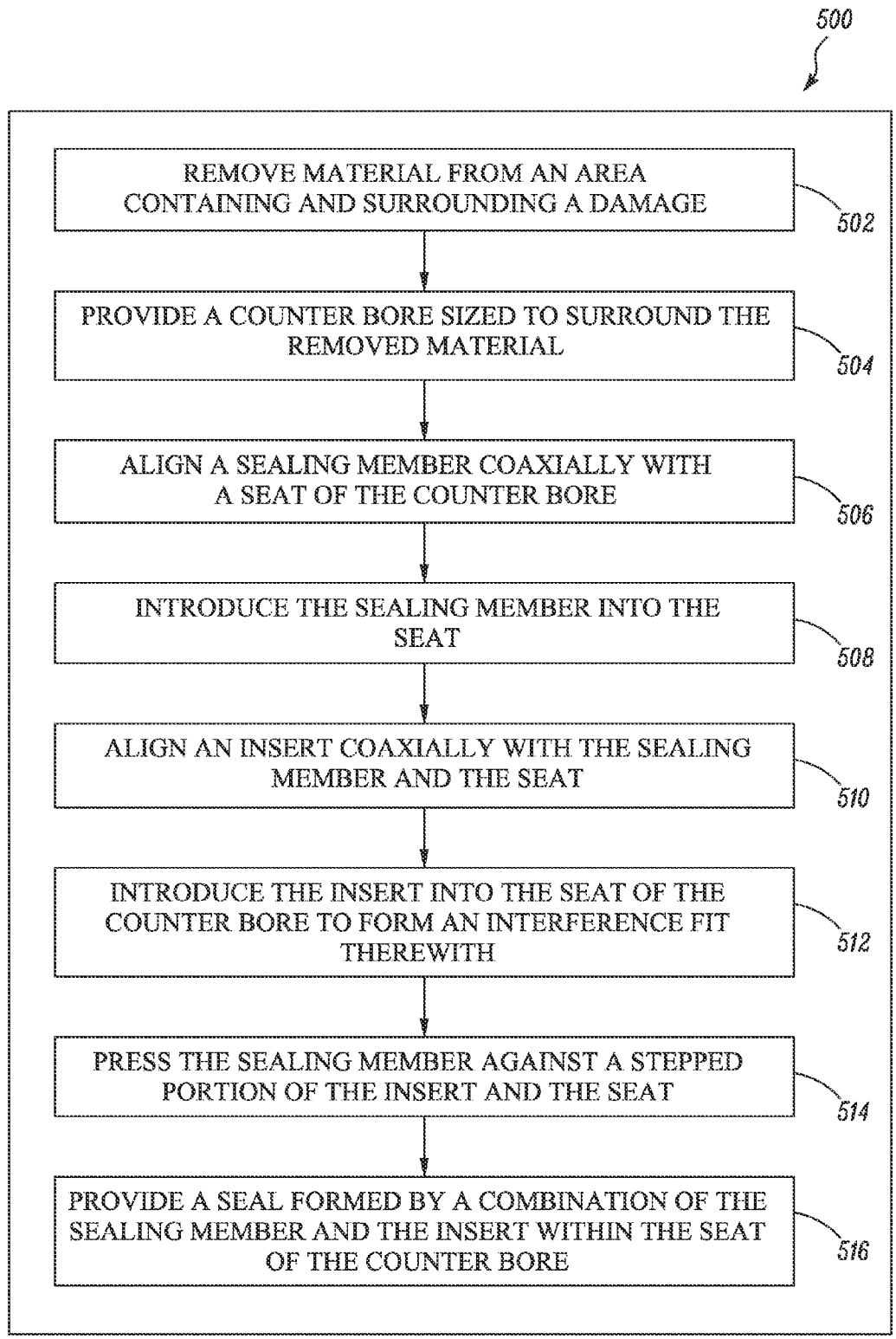
FIG. 5 shows a flowchart of a method for repairing the cylinder block having the water ferrule.

FIG. 5 is a method 500 for repair of the cylinder block 100 having the water ferrule 106. The water ferrule 106 includes damage 108 in at least one area proximate to the water ferrule 106. At step 502, the material from the area containing and surrounding the damage 108 is removed. At step 504, the counter bore 110 is provided. As described above, the counter bore 110 is sized to surround the removed material.

At step 506, the sealing member 112 is coaxially aligned with the seat of the counter bore 110. At step 508, the sealing member 112 is introduced into the seat of the counter bore 110. In one embodiment, in order to secure the sealing member 112 within the seat of the counter bore 110, the adhesive is provided within the counter bore 110.

At step 510, the insert 114 is coaxially aligned with the sealing member 112 and the seat of the counter bore 110. At step 512, the insert 114 is introduced into the seat of the counter bore 110, such that the interference fit is formed therebetween. At step 514, the sealing member 112 is pressed against the stepped portion 116 of the insert 114 and the seat of the counter bore 110. The sealing member 112 is configured to be captured or held in place within the groove 118 formed between the counter bore 110 and the stepped portion 116 of the insert 114.

At step 516, the seal is formed by a combination of the sealing member 112 and the insert 114 within the seat of the counter bore 110. The seal may minimize and/or prevent leaks and may channelize the water to flow through the bore of the water ferrule 106. The seal may prevent the water from leaking through and around the bore of the water ferrule 106 during engine operation.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for repair of a cylinder block including a water ferrule having damage in at least one area proximate to the water ferrule, the method comprising:
   removing material from the area containing and surrounding the damage;
   providing a counter bore sized to surround the removed material, the counter bore positioned on one end of the water ferrule such that a bore of the water ferrule communicates with the counter bore, the counter bore configured to define a seat at the one end of the water ferrule;
   aligning a generally ring shaped sealing member coaxially with the seat of the counter bore;
   introducing the sealing member into the seat, the sealing member having an outer diameter lesser than an outer diameter of the counter bore;
   aligning an insert coaxially with the sealing member and the seat, the insert having a stepped portion at one end, the stepped portion extending axially from a side of the insert facing the sealing member, wherein an outer diameter of the stepped portion is less than an outer diameter of the insert;
   introducing the insert into the seat of the counter bore to form an interference fit therewith, wherein the sealing member is disposed within a groove defined by the stepped portion of the insert and the seat of the counter bore;
   pressing the sealing member against the stepped portion of the insert and the seat; and
   providing a seal formed by a combination of the sealing member and the insert within the seat of the counter bore.

2. The method of claim 1, wherein the sealing member has an inner diameter greater than a diameter of the bore of the water ferrule.

3. The method of claim 1, wherein a thickness of the stepped portion of the insert is less than a thickness of the sealing member.

4. The method of claim 1, wherein a thickness of the insert is equal to a depth of the counter bore.

5. The method of claim 1, wherein the depth of the counter bore is less than a depth of the bore of the water ferrule.

6. The method of claim 1 further comprising:
   providing an adhesive within the counter bore, the adhesive configured to hold the insert within the counter bore.

7. The method of claim 1, wherein the insert is made of a metal.

8. The method of claim 1, wherein the sealing member includes an O-ring.

9. A repaired cylinder block having a water ferrule, the water ferrule comprising:
   a generally ring shaped sealing member provided within a seat defined by a counter bore of the water ferrule, the counter bore being provided on one end of the water ferrule such that the counter bore is sized to surround a material removed from the cylinder block containing damage in at least one area proximate to the water ferrule, wherein the sealing member has an outer diameter less than an outer diameter of the counter bore; and
   an insert forming an interference fit with the seat, the insert having a stepped portion facing the sealing member, the stepped portion extending axially from a side of the insert facing the sealing member and having an outer diameter less than an outer diameter of the insert, wherein the sealing member is disposed within a groove defined by the stepped portion of the insert and the seat of the counter bore,
   wherein the sealing member is configured to press against the stepped portion of the insert and the seat such that a combination of the sealing member and the insert forms a seal within the seat of the counter bore.

10. The repaired cylinder block of claim 9, wherein the sealing member has an inner diameter greater than a diameter of the bore of the water ferrule.

11. The repaired cylinder block of claim 9, wherein a thickness of the stepped portion of the insert is less than a thickness of the sealing member.

12. The repaired cylinder block of claim 9, wherein a thickness of the insert is equal to a depth of the counter bore.

13. The repaired cylinder block of claim 9, wherein the depth of the counter bore is less than a depth of the bore of the water ferrule.

14. The repaired cylinder block of claim 9 further comprising:
 an adhesive provided within the counter bore, the adhesive configured to hold the insert within the counter bore.

15. The repaired cylinder block of claim 9, wherein the insert is made of a metal.

16. The repaired cylinder block of claim 9, wherein the sealing member includes an O-ring.

* * * * *